(12) United States Patent
Okubo

(10) Patent No.: US 7,184,589 B2
(45) Date of Patent: Feb. 27, 2007

(54) IMAGE COMPRESSION APPARATUS

(75) Inventor: Nobuyuki Okubo, Unoke-machi (JP)

(73) Assignee: PFU Limited, Ishikawa (JP)

( * ) Notice: Subject to any disclaimer, the term of this patent is extended or adjusted under 35 U.S.C. 154(b) by 728 days.

(21) Appl. No.: 10/642,613

(22) Filed: Aug. 19, 2003

(65) Prior Publication Data
US 2004/0264793 A1 Dec. 30, 2004

(30) Foreign Application Priority Data
Jun. 25, 2003 (JP) .............................. 2003-180554

(51) Int. Cl.
*G06K 9/00* (2006.01)
*G06K 9/36* (2006.01)
*G06K 9/20* (2006.01)
(52) U.S. Cl. ...................... 382/166; 382/232
(58) Field of Classification Search ................ 382/162, 382/166, 195, 203, 204, 266, 267, 282, 232, 382/239, 299, 294; 358/3.21, 3.22, 3.23, 358/464, 465
See application file for complete search history.

(56) References Cited
U.S. PATENT DOCUMENTS
6,882,341 B2 * 4/2005 Yhann ........................ 345/419
7,120,297 B2 * 10/2006 Simard et al. .............. 382/166
2005/0179956 A1 * 8/2005 Silverbrooks et al. ..... 358/3.28

FOREIGN PATENT DOCUMENTS
JP 2003-18413 1/2003

* cited by examiner

Primary Examiner—Yon J. Couso

(57) ABSTRACT

An image compression apparatus has a connected pixel extraction unit for extracting drawn connected pixels contained in the color document image, a foreground/background image classification unit for classifying connected pixel groups extracted by the compressed connected pixel extraction unit as a foreground image or a background image, a color-by-color-based binary image generation unit for generating binary image data for each color from information on the color of the connected pixel groups classified as a foreground image, a foreground image compression unit for compressing the color binary image data generated by the compressed color-by-color-based binary image generation unit, a background image generation unit for generating a background image, a background image compression unit for compressing the background image generated by the compressed background image generation unit, and a compressed image data generation unit for combining the foreground image data compressed by the foreground image compression unit with the background image data compressed by the background image compression unit into a single piece of compression image data.

4 Claims, 12 Drawing Sheets

CONNECTED PIXEL GROUP #1                ORIGINAL IMAGE DATA

CONNECTED PIXEL GROUP #2                ORIGINAL IMAGE DATA

FIG. 11
300-dpi BACKGROUND IMAGE
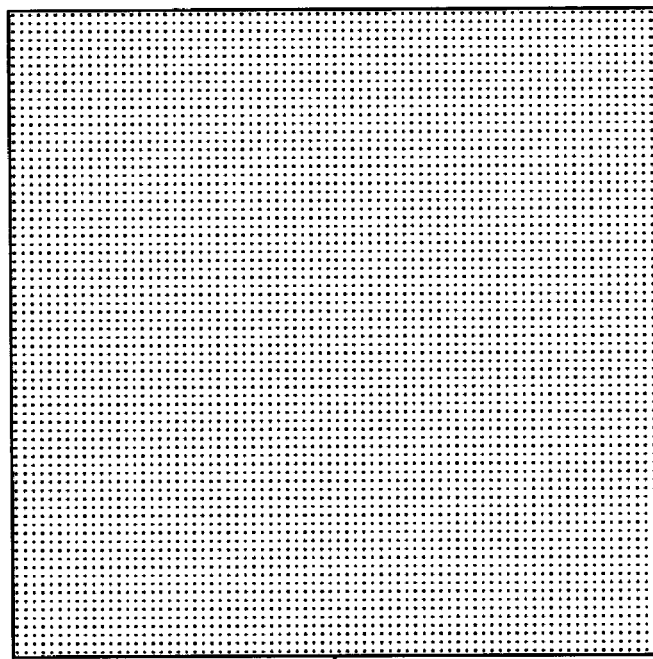
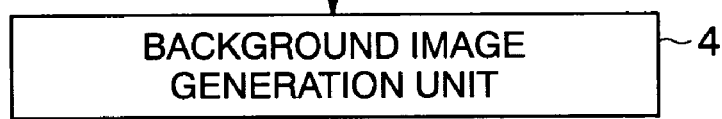
BACKGROUND IMAGE GENERATION UNIT ~4
REDUCE IMAGE BY HALF BOTH IN VERTICAL AND HORIZONTAL DIRECTIONS
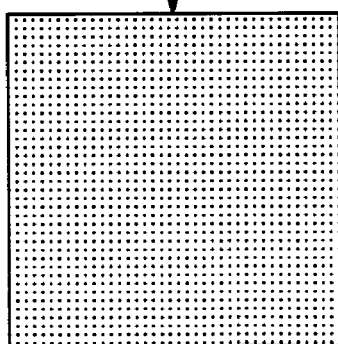
AMOUNT OF DATA IS REDUCED BY A FACTOR OF 4
150-dpi BACKGROUND IMAGE

FIG. 12

| HEADER INFORMATION |
| COMPRESSED FOREGROUND IMAGE OF COLOR A |
| COMPRESSED FOREGROUND IMAGE OF COLOR B |
| COMPRESSED FOREGROUND IMAGE OF COLOR C |
| COMPRESSED FOREGROUND IMAGE OF COLOR D |
| COMPRESSED BACKGROUND IMAGE |

IMAGE COMPRESSION APPARATUS

BACKGROUND OF THE INVENTION

1. Field of the Invention

This invention relates to an image compression apparatus, and more particularly to an image compression apparatus that achieves compression of digital color document image data read through an image reader with a high compression ratio without sacrificing the visibility of objects such as characters.

2. Description of the Related Art

An enormous amount of data is generated when an original image optically read by an image reader such as a scanner is digitized for used as document image data. The amount of data produced without compression can be so large that it poses significant problems when the data is stored or transmitted over a network.

For example, the size of image data in an A4-sized image with 24 bits per pixel of color information read at a resolution of 300 dpi may be as huge as 24 megabytes.

Conventionally, such huge raw image data has been compressed with compression technologies such as JPEG compression to several hundred bytes of image data.

However, JPEG compression and other compression technologies have a problem that when color document image data containing characters is compressed and then decompressed to reconstruct the original image, the visibility of the characters displayed is decreased.

Further, when image data is compressed with MMR compression in order to prevent the visibility of characters from degrading, the compression ratio of photograph data contained in the image is also decreased.

To solve these problems, apparatuses (refer to Japanese Patent Laid-Open No. 2003-018413, for example) have been devised that separate a region containing characters from an area containing a photograph in a color document image and different compression technologies suitable for the different regions are used to compress the image data.

However, such apparatuses have a problem that they cannot successfully separate an area of an original document image that contains characters superimposed on a light photographic image from the photographic image and therefore compress the characters as the photograph area, thereby degrading the visibility of the characters.

In summary, the prior art has the following problems:

An enormous amount of data is generated when a color document image optically read by an image reader is digitized to produce digital image data. The size of the image data may be so large that it is unmanageable when it is stored or transmitted over a network.

To solve the problem, apparatuses have been devised that use compression technologies such as JPEG compression to compress image data in color document images to reduce its size. However, these apparatuses have problems that the visibility or the compression ratio of some objects (characters and photographs) contained in the color document images is degraded.

To solve these problems, apparatuses have been devised that separate a region containing characters from an area containing a photograph in a color document image and different compression technologies suitable for the different regions are used to compress the image data, thereby achieving high compression ratios without degrading the visibility of characters.

However, these apparatuses have problems that they fail to separate a character region from a photograph region when characters are superimposed on the photograph, thereby decreasing the visibility of the characters or the compression ratio of the image.

SUMMARY OF THE INVENTION

An object of the present invention is to provide an image compression apparatus that can compress image data produced by reading a color document image containing both text and graphics such as photograph at a high compression ratio without degrading the visibility of objects such as characters.

An image compression apparatus according to the present invention for compressing color document image data has connected a pixel extraction unit for extracting drawn connected pixels contained in the color document image, a foreground/background image classification unit for classifying connected pixel groups extracted by the connected pixel extraction unit as a foreground image or a background image, a color-by-color-based binary image generation unit for generating binary image data for each color from information on the color of the connected pixel groups classified as a foreground image, a foreground image compression unit for compressing the color binary image data generated by the color-by-color-based binary image generation unit, a background image generation unit for generating a background image, a background image compression unit for compressing the background image generated by the background image generation unit, and a compressed image data generation unit for combining the foreground image data compressed by the foreground image compression unit with the background image data compressed by the background image compression unit into a single piece of compression image data.

BRIEF DESCRIPTION OF THE DRAWINGS

FIG. 11 is a diagram showing a process for generating a low-resolution reduced image as a background image.

FIG. 12 is a diagram showing a process for generating a piece of a piece of compressed image data.

DETAILED DESCRIPTION OF THE PREFERRED EMBODIMENTS

Figure 1:
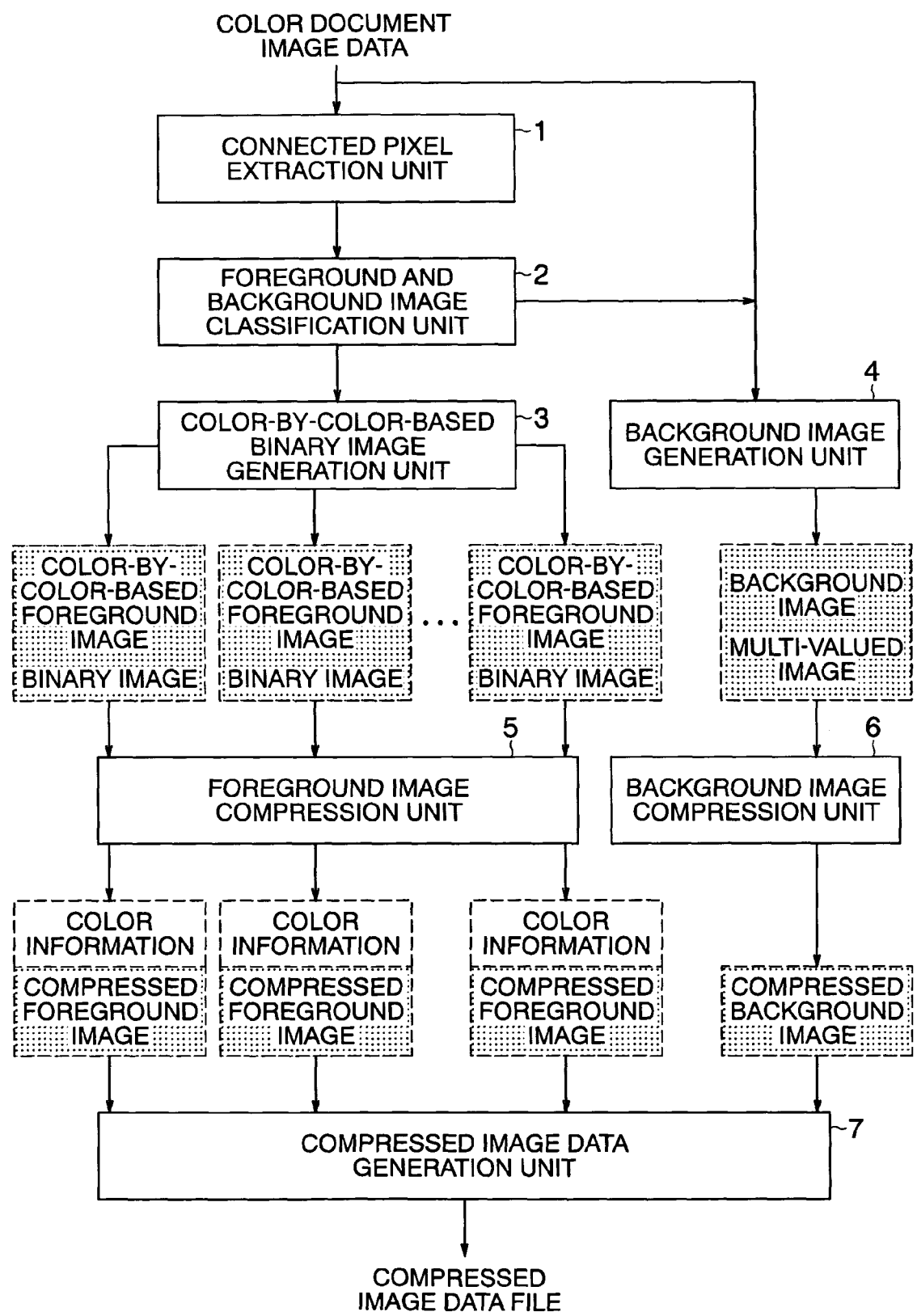
FIG. 1 is a diagram showing an outline of the present invention.

To solve the problems described above, the following unit are taken:

There is provided a connected pixel extraction unit for examining the drawing state of pixels making up a drawn object such as a character or a graphic in image data in a color document image read by a image input device (such as a scanner or a digital camera) and extracting as a connected pixel group a cluster of connected pixels that are drawn pixels connected with each other.

The connected pixel extraction unit binarizes a color image into a monochrome image data and groups all pixels in the binarized image into sets of connected pixels that are drawn pixels connected with each other, and extracts information on the sets of connected pixel groups.

A foreground/background image classification unit is provided for classifying the extracted connected pixel groups as a foreground image group or a background image group.

The foreground/background image classification unit assumes connected pixel groups having sizes (the number of vertical and horizontal pixels) outside a predetermined range to belong a background image and extracts connected pixel groups within the predetermined range as belonging to a foreground image.

Also provided is a color-by-color-based binary image generation unit for extracting color information from the connected pixels groups classified as belonging to the foreground image and generating color binary images.

The color-by-color-based binary image generation unit perform connected pixel color extraction by extracting information about the color of each pixel in a connected pixel group from the uncompressed color image data and adding the color information to information about the binary connected pixel group. It then draws the connected pixel groups that have color information within the same range on one plane to generate a color binary image. In this way, it generates plane images having different colors.

Also provided is a foreground image compression unit that compresses the foreground images of different colors generated by the color-by-color-based binary image generation unit.

The foreground image compression unit compresses the foreground binary image of each color by using a compression technology such as MMR compression that gives priority to resolution and is suitable for compression of characters and simple graphics such as straight lines.

Also provided is a background compression unit for compressing connected pixel group images classified as a background image group.

The background image compression unit fills a portion of the read color document image, in which a connected pixel group classified as a foreground image is drawn with a color similar to the color of the adjacent pixels. It transforms the entire image into a low-resolution image, then compresses the image with a compression technology such as JPEG compression that is suitable for compressing photographs.

Filling the foreground image portion on the background image with a color similar to the color of the adjacent pixels in this way can increase the compression ratio of compression technologies such as JPEG compression compared with cases in which the foreground image portion is retained.

Also provided is a compressed image data generation unit for combining foreground image of different colors compressed by the foreground image compression unit and background image data compressed by the background image compression unit into a single piece of compressed image data.

An embodiment of the present invention will be described below.

The connected pixel extraction unit is provided for searching image data read by an image input device (such as a scanner or a digital camera) for connectivity between each pixel and its adjacent drawn pixels and extracting a cluster of connected pixel group.

Thus, information about a connected pixel group that makes up a drawn object (a character or a graphic) contained in the image can be extracted. This information about the connected pixel group can be used to determine whether the drawn object is a drawn object that requires less color gradations but a high resolution of its decompressed image (such as a character or a simple graphic such as a straight line) or a drawn object that requires less resolution but more color gradations (such as a photograph or a character filled with a complex color).

The Foreground/background classification unit is provided that uses extracted connected pixel group information to obtain information about the rectangle circumscribing the connected pixel group and, if the size of the rectangle is outside a predetermined range, classifies the connected pixel group as belonging to a background image, or if it is within the predetermined range, determines it as belonging to a foreground image.

Thus, a drawn object in the color document image can properly be classified as a drawn object in the foreground to which resolution-oriented compression is appropriate or as a drawn object in the background to which color-gradation-oriented compression is appropriate, according to the information about the size of the connected pixel group making up the drawn object in the color document image data.

The color-by-color-based binary image generation unit is provided that extracts information about the color of each of the connected pixel groups classified as belonging to the foreground image by the foreground/background classification unit from the original color document image data, uses the information to further classify the connected pixel groups classified as the foreground image by color within the same range, then draws each connected pixel group on the plane of the color corresponding to it, thus generating color binary images of different colors.

Thus the foreground image for which resolution-oriented compression is appropriate can be extracted as one or more pieces of binary image data having color gradations each of which is represented by one bit. The extracted binary image data of each color can be compressed with a resolution-oriented compression technology suitable for binary image compression.

Also provided is a background image compression unit that fills pixels in the connected pixel group classified as a foreground pixel in the color document image data with a color similar to the color of the adjacent pixels, then transforms the background image into a low-resolution image. It compresses the resulting low-resolution image data with a color-gradation-oriented compression technology.

Thus, image data including only background images and excluding drawn objects in the foreground for which resolution-oriented compression is appropriate can be extracted, the extracted background data can be transformed into a low-resolution background image to reduce the amount of the image data, and then the resulting image data can be compressed with a color-gradation-oriented compression technology to minimize the size of the compressed background image data.

Some image information is lost by the transformation of the background image to the low-resolution background image. However, this have no significant effect on the picture quality of decompressed image because only the drawn objects that do not require high resolution are extracted and contained in the background image.

Also provided is a compressed image data generation unit that combines the foreground and background images compressed by the foreground image compression unit and the background image compression unit into one piece of compressed image data.

Thus, the pieces of drawn object image data included in the color document image data can be compressed with favorable compression technologies and combined into one piece of compressed image data, thereby generating an image data file of small data size suitable for storage and transmission over a network without sacrificing the picture quality of decompressed image.

A typical embodiment of the present invention will be described below. In the following description, like parts are labeled with like reference numbers or symbols and the detailed description of which will be omitted in some cases.

An apparatus of the present invention is an image compression apparatus that compresses color document image data read by an image input device such as a scanner or a digital camera with extremely high compression rates without sacrificing its picture quality.

To accomplish this, the present apparatus uses a compression method that switches from one compression technology to another according to the property of a drawn object to compress it.

Document images can be roughly classified into the following categories: (1) a text component, (2) a line component, (3) a graphic component, (4) a photograph component, (5) dot component, and (6) a background.

Different resolutions and color gradation properties are required for reproducing these drawn objects on paper or a display.

For representing characters or simple lines, a resolution of approximately 300 dpi and a color gradation of one bit are required. For representing photographs, dots, backgrounds, and characters filled with complex color, a resolution of 150 dpi and a color gradation of 24 bits are required.

In this way, different drawn objects in color document image data have different picture quality requirements. This characteristic can be used to group images as a foreground image to which resolution-orient compression is appropriate or a background image to which color-gradation-oriented compression is appropriate to maximize the data compression ratio without sacrificing the picture quality.

Therefore, the present apparatus uses connectivity between pixels making up a drawn object in color document image data as the criterion for classifying them as a foreground or background image. For that purpose, the apparatus comprises a connected pixel extraction unit 1 for extracting connected pixel groups, as shown in FIG. 1.

Figure 2:
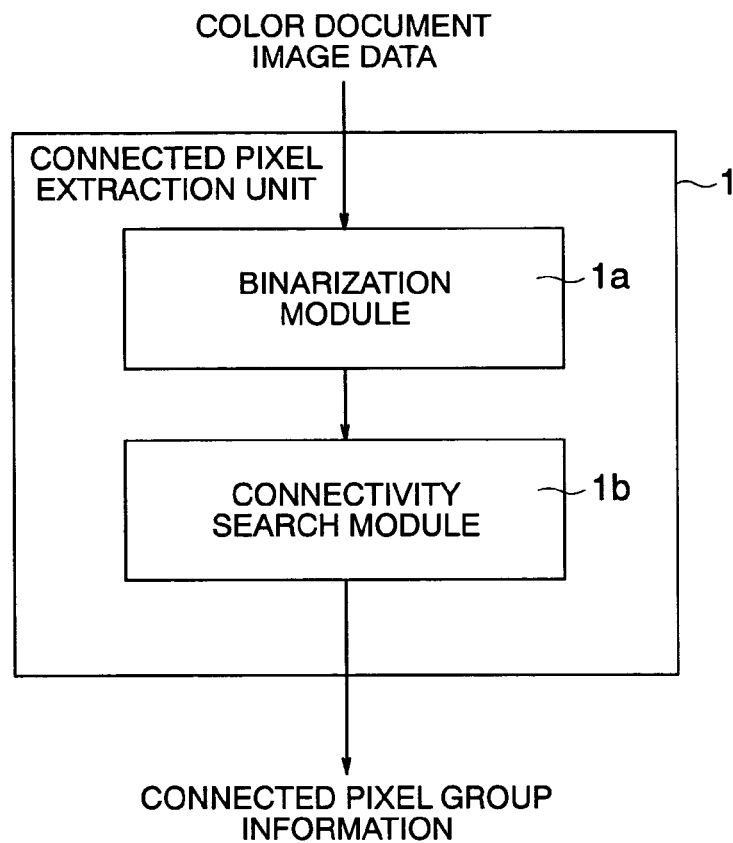
FIG. 2 is a diagram illustrating a configuration of a connected pixel extraction unit.

The connected pixel extraction unit 1 may have a binarization module 1a for binarizing color document image data as shown in FIG. 2.

This is provided for binarizing image data to facilitate searching for connectivity between pixels making up a drawn object in the image data.

The binarization is accomplished by representing pixels having intensities exceeding a predetermined threshold by 1 and representing pixels having intensities less than the threshold by 0 on the basis of information about the intensity of each pixel in the color document image.

The threshold may be set to a low value if the intensity of an original color document image as a whole is low and to a high value if the intensity of the original color document image as a whole is high so as to ensure that the foreground image is extracted even if the difference in intensity between the background image and foreground image.

The connected pixel extraction unit 1 comprises a connectivity search module 1b for searching binary image data generated by the binarization module 1a for searching the pixels adjacent to each pixel of interest for a group of connected pixel and extract it.

Figure 3:
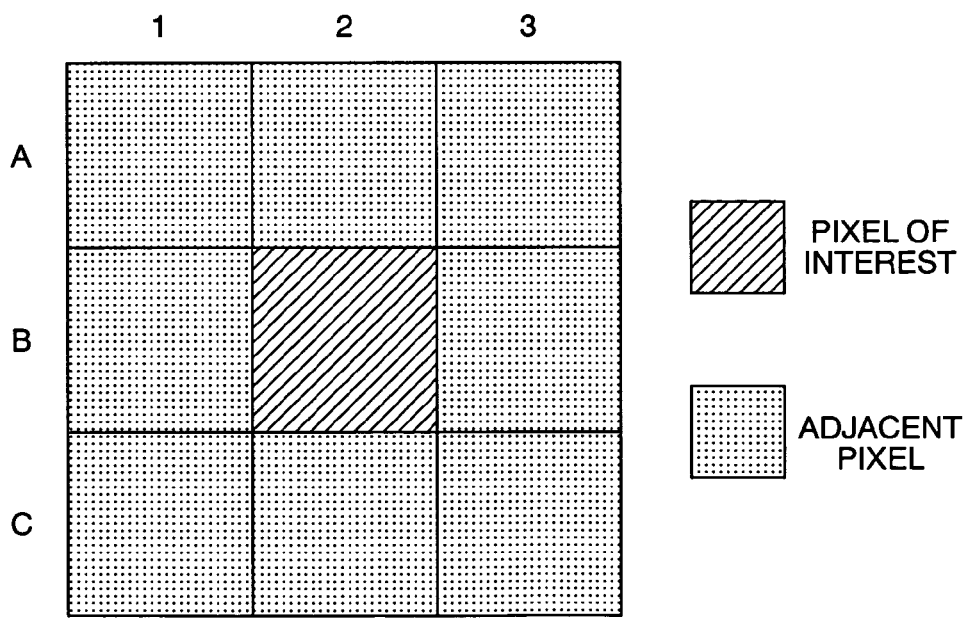
FIG. 3 is a diagram for explaining a process for extracting connected pixels.

In particular, the connectivity search module 1b searched the pixels adjacent to a pixel of interest for drawn pixels as shown in FIG. 3. If any of the adjacent pixels is drawn, it determines that the pixel of interest and that adjacent pixel is connected. That is, if any of the pixels A1, A2, A3, B1, B3, C1, C2 and C3 adjacent to the interested pixel B2 is drawn, the drawn pixel or pixels are regarded as being connected.

Figure 4:
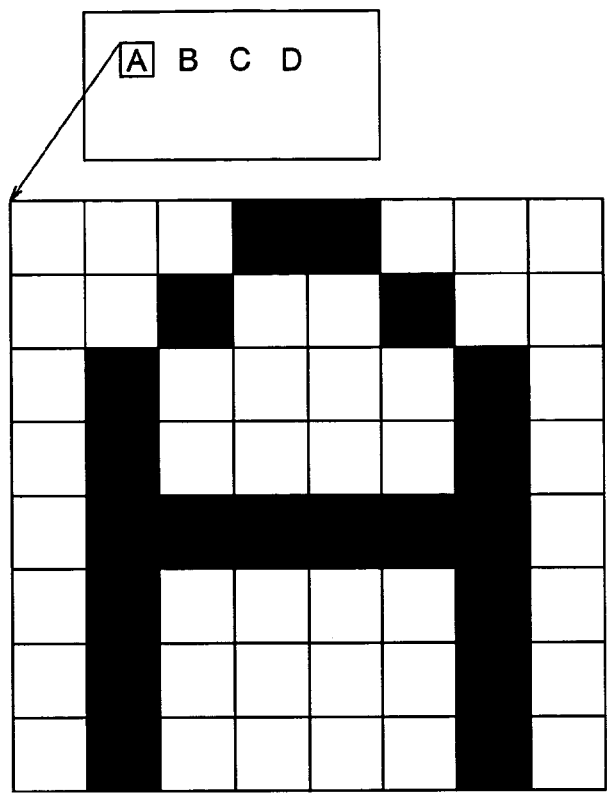
FIG. 4 is a diagram showing a drawn object extracted by the connected pixel extraction unit.

Thus, a drawn object (such as a character, graphic, or photograph) can be extracted as a cluster of pixels constituting it, as shown in FIG. 4. That is, FIG. 4 shows the pixel group extracted by connecting pixel group extraction.

The detection of connectivity is performed on every pixel of the binary image data to extract all connected pixel group information contained in the image data, and the extracted connected pixel information is stored in a memory device.

As shown in FIG. 1, a foreground/background image classification unit 2 is provided for classifying connected pixel groups extracted by the connected pixel extraction unit 1 as belonging to a foreground image for which resolution-oriented compression is appropriate or as belonging to a background image for which color-gradation-oriented compression is appropriate.

If the size of the rectangle circumscribing a connected pixel group is within a predetermined range, the connected pixel group is classified as belonging to a foreground image. Otherwise, it is classified as belonging to a background image.

The predetermined range may be such that the number of pixels is at least 2×2 and the number of the vertical and horizontal pixels does not exceed 150 pixels.

The size may be chosen with consideration given to the characteristics of resolution-oriented compression technologies such as MMR compression. The size of a connected pixel group may be the one appropriate for the compression technology to be used.

Furthermore, if the size of a connected pixel group is within the predetermined range but the pixels making up the connected pixel group are filled with a number of colors, then the pixel group may be classified as a background image to give a higher priority to the color gradations.

Figure 5:
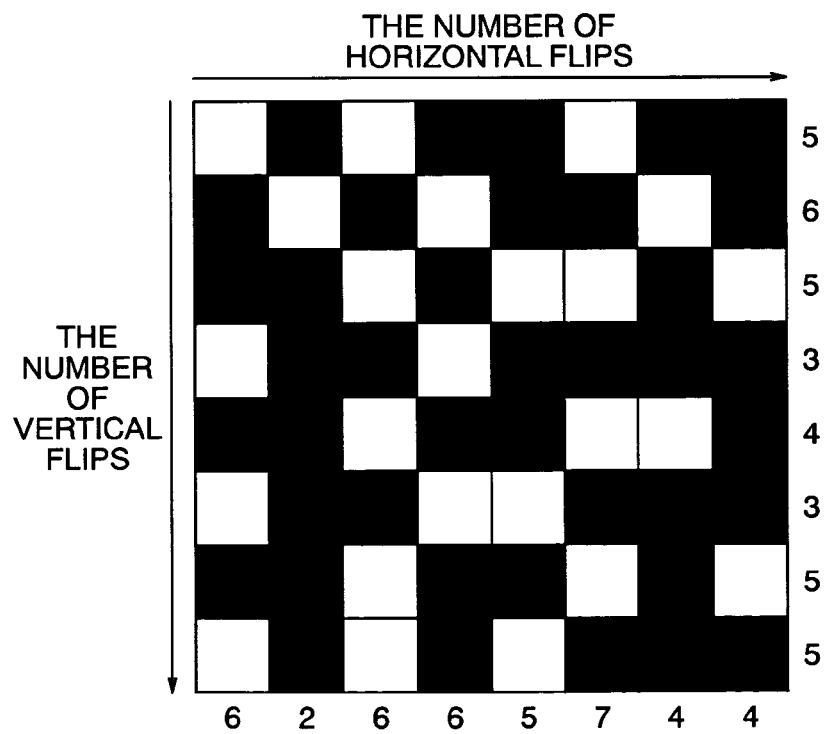
FIG. 5 is a diagram explaining a process for identifying a dot image.

In order to classify connected pixel groups such as dot images that require less resolution as belonging to a background image, the number of switches (or flips) between the on (or drawn) and off (or not drawn) states of vertical and horizontal connected pixels falling within a predetermined range is checked as shown in FIG. 5 to see whether or not the total number of switches exceeds a predetermined value, thereby determining whether or not the connected pixel group is a dot image. If the connected pixel group is found to be a dot image, it may be classified as a background image. FIG. 5 shows the case of 40 vertical flips and 36 horizontal flips, total of 76 flips. If predetermined criterion value for determination is set to 20, it is determined that the image, which has more than 20 flips, is a dot image.

Figure 6:
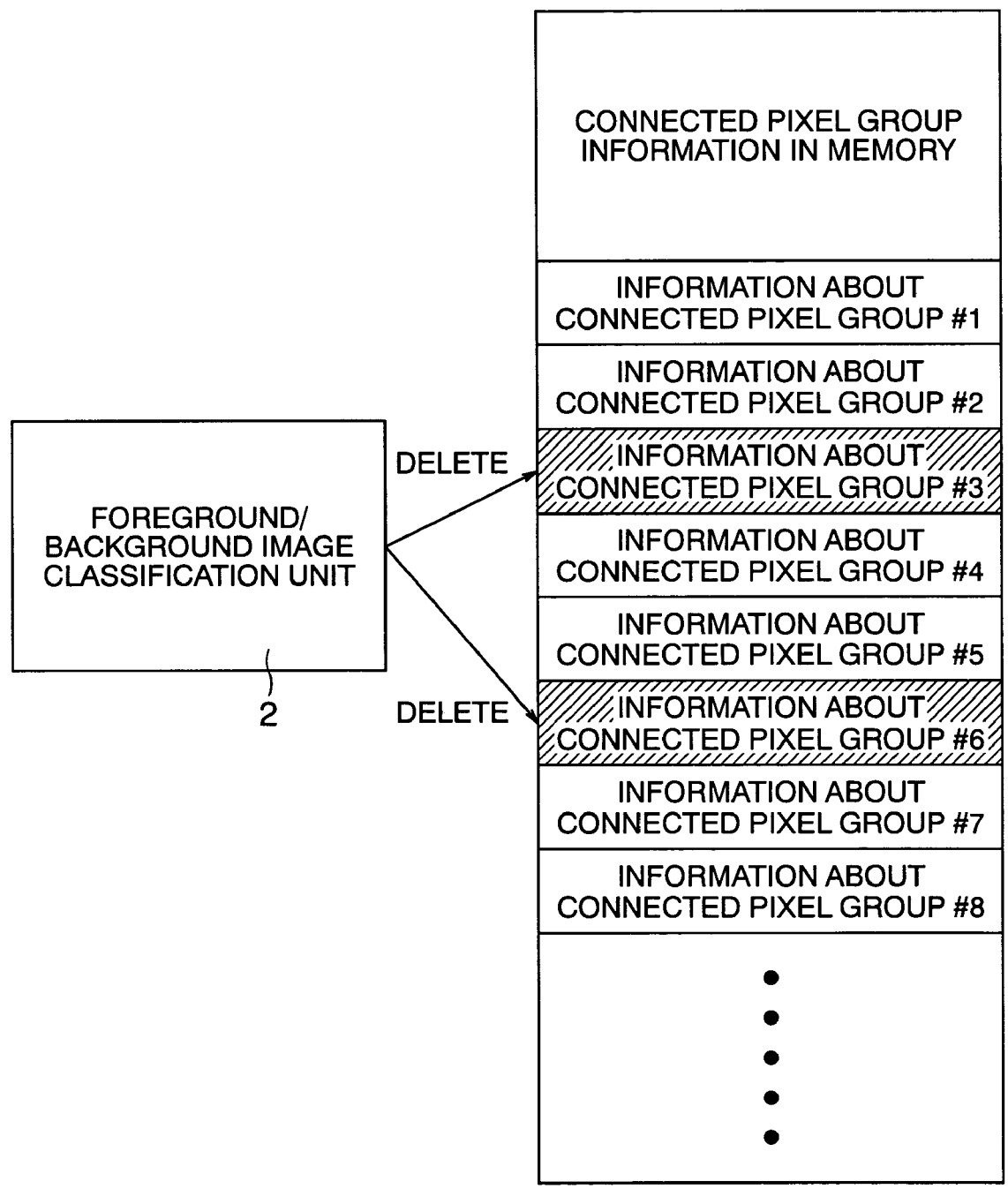
FIG. 6 is a diagram for explaining the generation of information including only a connected pixel group classified as belonging to a foreground image.

The foreground/background image classification unit 2 classifies information on all connected pixel groups (#1 to #8) extracted by the connected pixel extraction unit 1 and stored in memory as shown in FIG. 6 as a foreground image or background image. The foreground/background image classification unit 2 retains information on connected pixel groups (#1, #2, #4, #5, #7 and #8) classified as a foreground image and deletes information on connected pixel groups (#3 and #6) classified as a background image to generate information only on the connected pixel groups classified as a foreground image.

A color-by-color-based binary image generation unit 3 is provided that obtains the colors of the connected pixel groups classified as a foreground image from information on the colors of the original image and groups them by color falling within the same range to generate binary images having the different colors.

The group color of each group may be the average of all colors in the original image that belong to that connected pixel group.

Figure 7A:
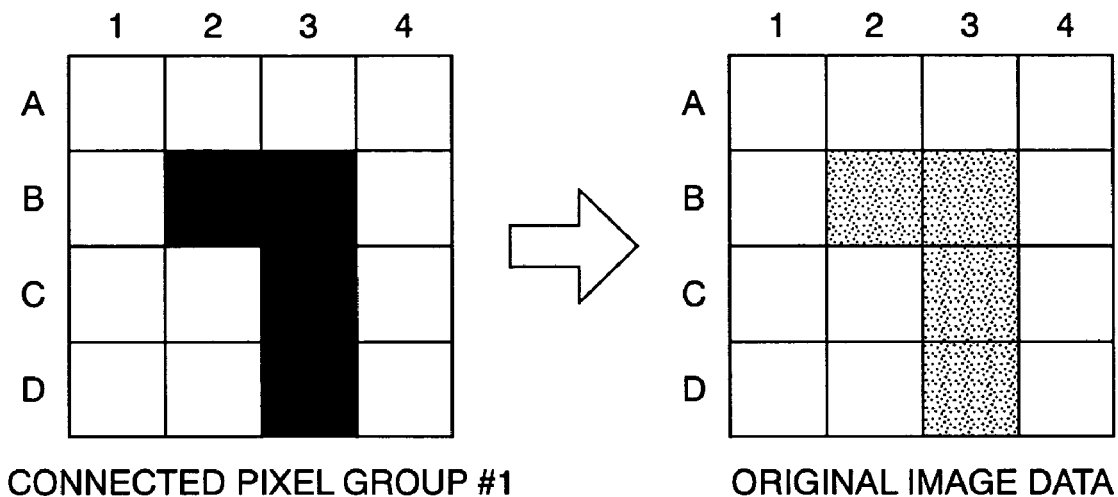
FIGS. 7A and 7B is a diagram showing classification of connected pixel groups by group color.
Figure 7B:
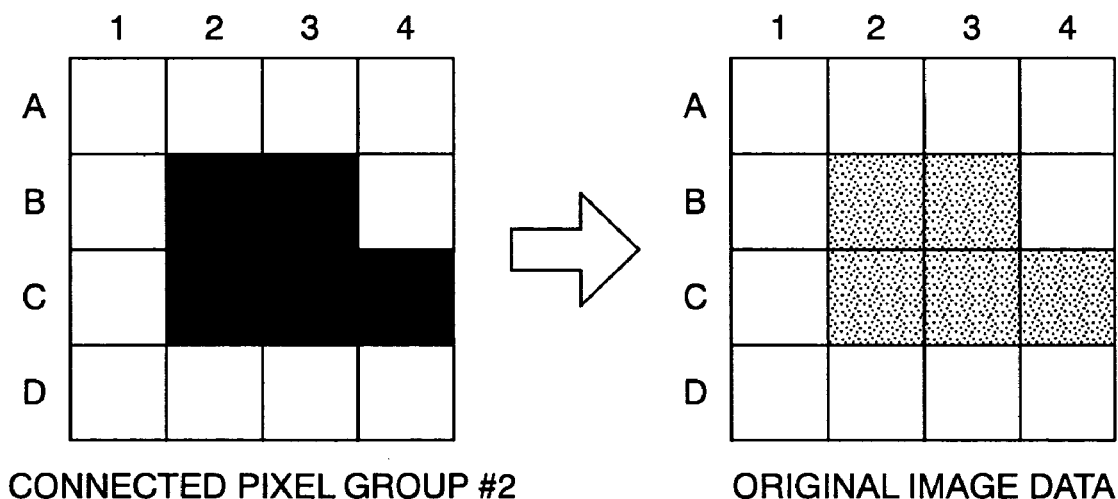

In particular, the average of colors of the pixels in the original image data that belong to each of the connected pixel groups classified as a foreground image is calculated as shown in FIGS. 7A and 7B. The colors of all connected pixel groups classified as a foreground image is obtained. Among the group colors, those colors that fall within the same range are assumed as the same and the foreground images are classified by color. For example, if each of RGB has 256 gray levels and the difference in gray levels of RGB between connected pixel groups is within a range plus or minus 10, then those groups are considered to be of the same color.

In FIG. 7A, when average of the color values of the pixels B2, B3, C3 and D3, which are belonging to a connected pixel group (group #1), is R (20), G (100), B (150), the group color of the connected pixel group #1 is R (20), G (100), B (150). In FIG. 7B, when average of the color values of the pixels B2, B3, C2, C3 and C4, which are belonging to a connected pixel group (group #2), is R (25), G (102), B (147), the group color of the connected pixel group #2 is R (25), G (102), B (147). When the difference in gray levels of RGB between connected pixel groups is within a range plus or minus 10, then those groups are considered to be of the same color group in this example. The differences in R, G and B are 5, 2 and 3, respectively. Therefore, the connected pixel groups #1 and #2 are considered to belong the same color group.

The criteria for determination of the same color can be set at the most preferable values depending on the size of compressed data and the reproducability of color of images after expansion.

Figure 8:
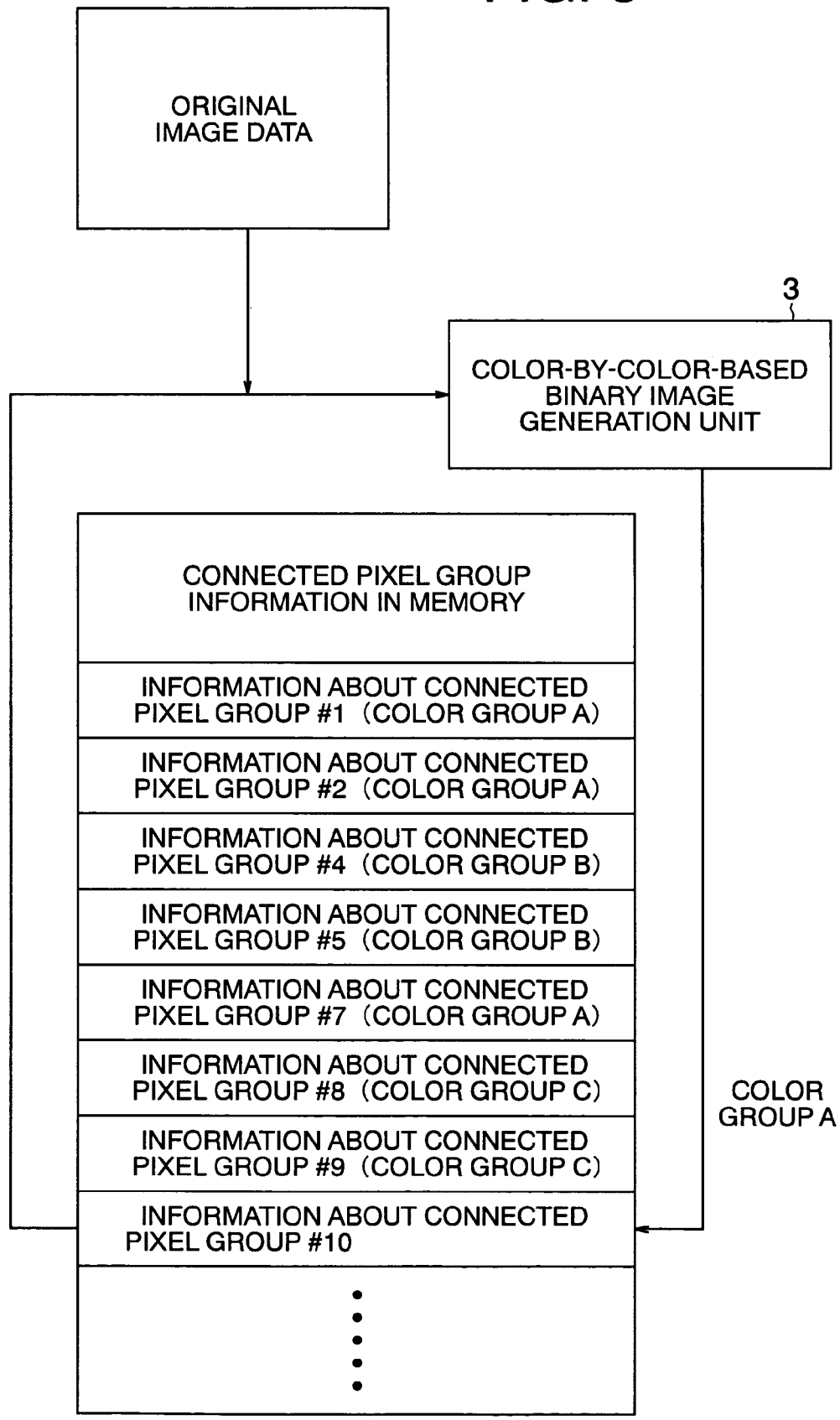
FIG. 8 is a diagram showing a process for grouping connected pixel groups into a number of color groups.

The color-by-color-based binary image generation unit 3 may group all connected pixel groups classified as a foreground image by group color on the basis of information only on the connected pixel groups classified as the foreground image generated in memory by the foreground/background image classification unit 2 as shown in FIG. 8. It may then add color group information (e.g. color group A) to information on the foreground connected pixel groups (e.g. group #10) stored in the memory.

Information on the positions of pixels in a connected pixel group may be taken into consideration to group neighboring pixels.

Figure 9:
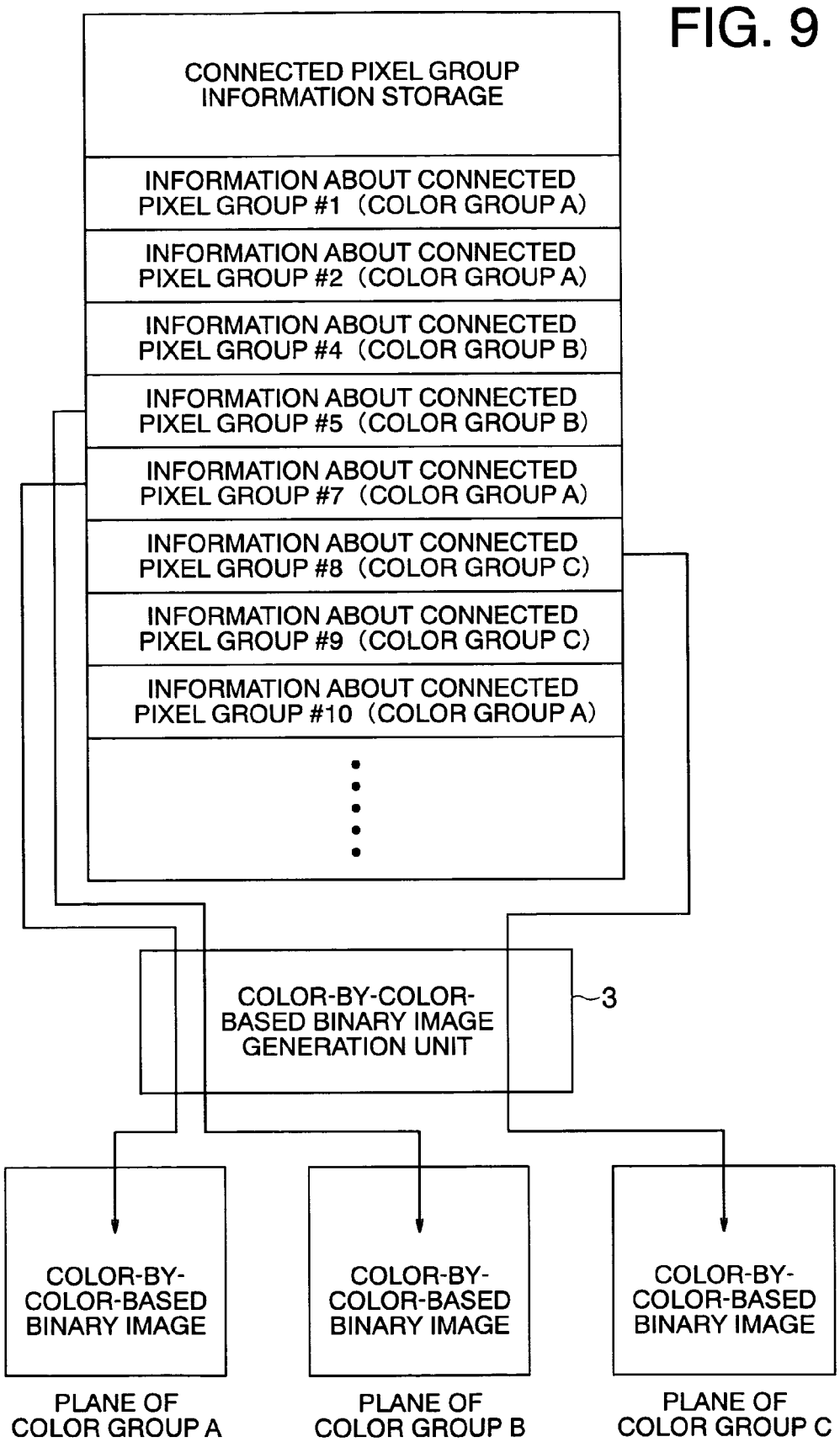
FIG. 9 is a diagram showing a process for drawing binary images on color drawing planes.

Each of the foreground connected pixel groups grouped by color is drawn on a drawing plain of each color (a memory area in the apparatus that is reserved for storing images) by the color-by-color-based binary image generation unit 3 as shown in FIG. 9. Thus, color binary image data is generated.

As many color binary images as color groups (e.g. three groups of color group #A, #B and #C) of foreground connected pixel groups are generated.

The generated color binary images are compressed by a foreground image compression unit 5 based on a resolution-oriented compression technology.

The compression technology used with the foreground image compression unit 5 may be MMR compression, JBIG compression, JBIG 2 compression, or the like.

Figure 10:
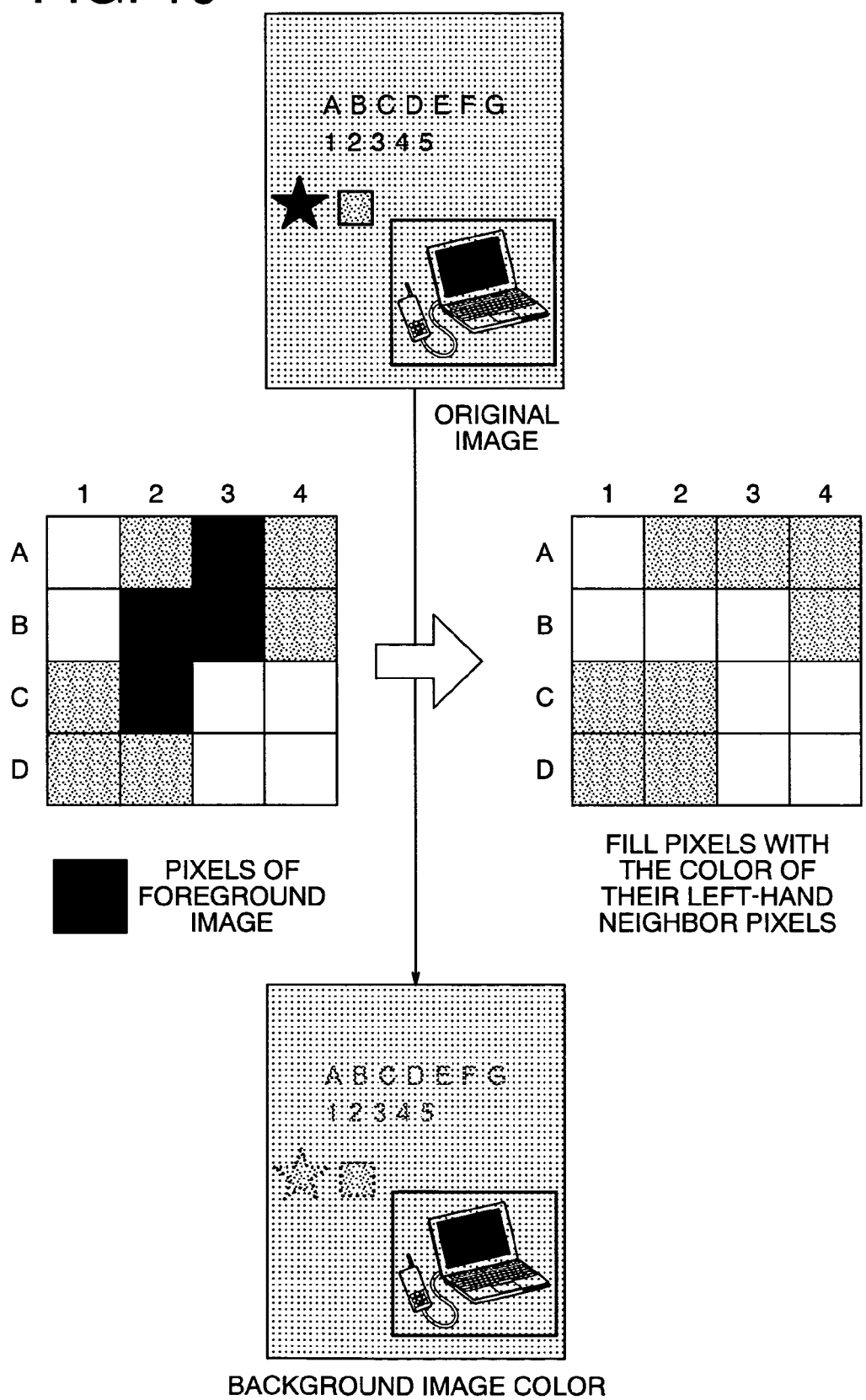
FIG. 10 is a diagram showing a process for filling foreground image pixels during generating a background image.

For background images, a background image generation unit 4 fills pixels that belong to connected pixel groups classified as belonging to a foreground image in the original image data with the color of their left-hand neighbor pixels, for example, as shown in FIG. 10, in order to maximize the compression ratio of gradation-oriented compression.

Thus, edge components, which hinders gradation-oriented compression, can be eliminated to achieve a higher compression ratio.

The background image (e.g. background image of 300 dpi) obtained by filling the foreground image portion in the original image is reduced (e.g. by half both In vertical and horizontal direction) by the background image generation unit 4 to the minimum image required to retain the picture quality of the decompressed image, as shown in FIG. 11 thereby creating a background image of low resolution (e.g. background image of 150 dpi) with a reduced amount of information (e.g. data volume is reduced to ¼).

The reduced background image is compressed with a gradation-oriented compression technology. The compression technology may be JPEG, JPEG 2000, PNG, ZIP compression or the like.

The unit described above provides as many pieces of compressed color binary image data as color groups, each of which is classified as being in the same color range, in the foreground images, and compressed multi-valued image data, which is the compressed background image.

A data generation unit 7 is provided that combines these pieces of compressed data into a compressed image data file.

The compressed image data generation unit 7 may combine the pieces of the compressed foreground binary image data corresponding to the different colors with the compressed background image data into one compressed data file as shown in FIG. 12, and add data attribute information such as the size of and compression technology for each piece of data contained in the file to the file as its header information, thereby allowing the original image to be reconstructed during decompression according to the header information.

Figure 13:
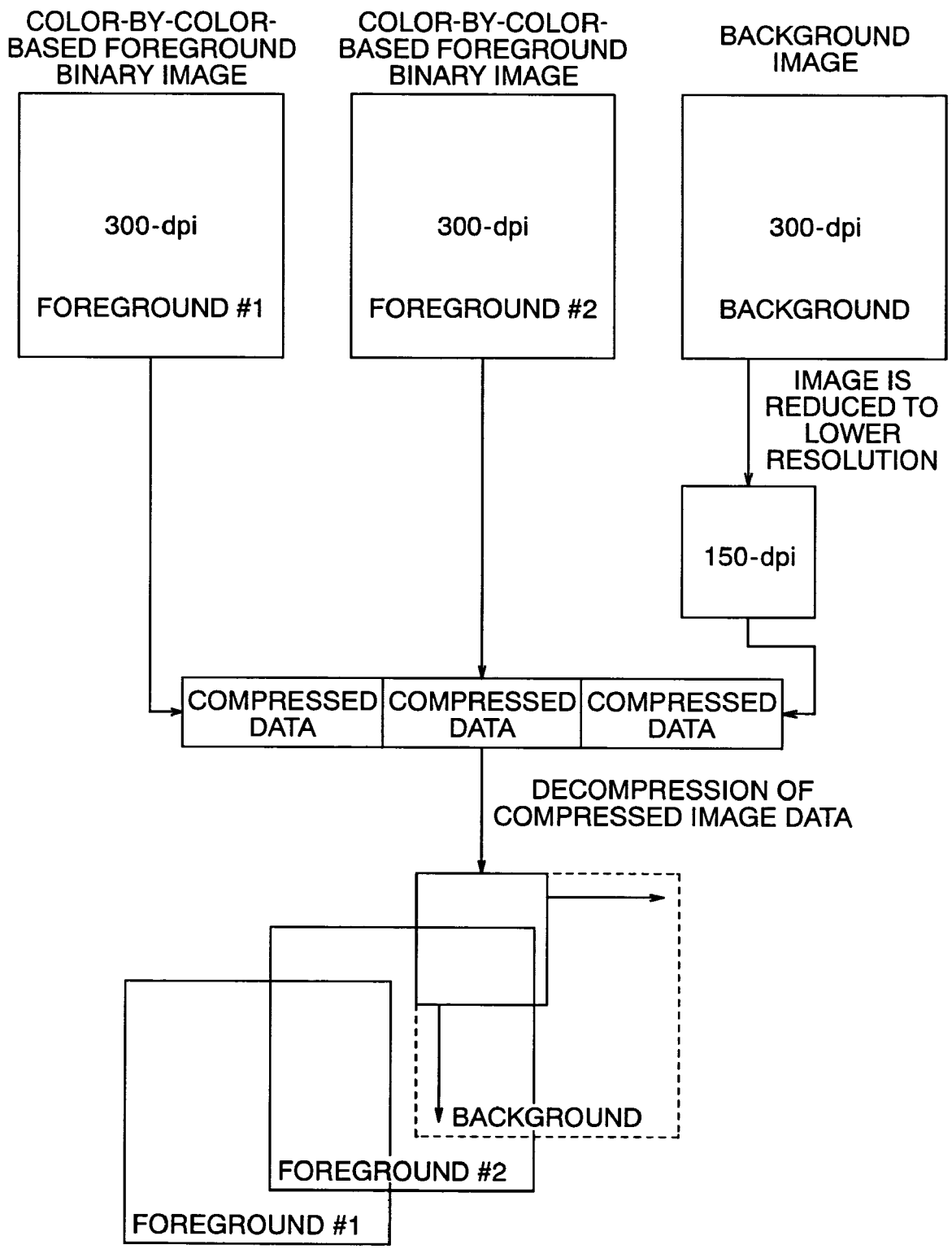
FIG. 13 is a diagram showing processes for compression and expansion.

As shown in FIG. 13, the present image compression apparatus decreases the resolution of the background image, which requires less resolution, to the minimum value required for retaining its picture quality to reduce the amount of the data. During decompression, the present image compression apparatus uses linear interpolation to enlarge the background image to increase its resolution to the same value as the resolution of the foreground images and combines them to reconstruct the original image. FIG. 13 shows the combination of the enlarged (from 150 dpi to 300 dpi) foreground images of different colors and the background image to reconstruct the original image.

Figure 14:
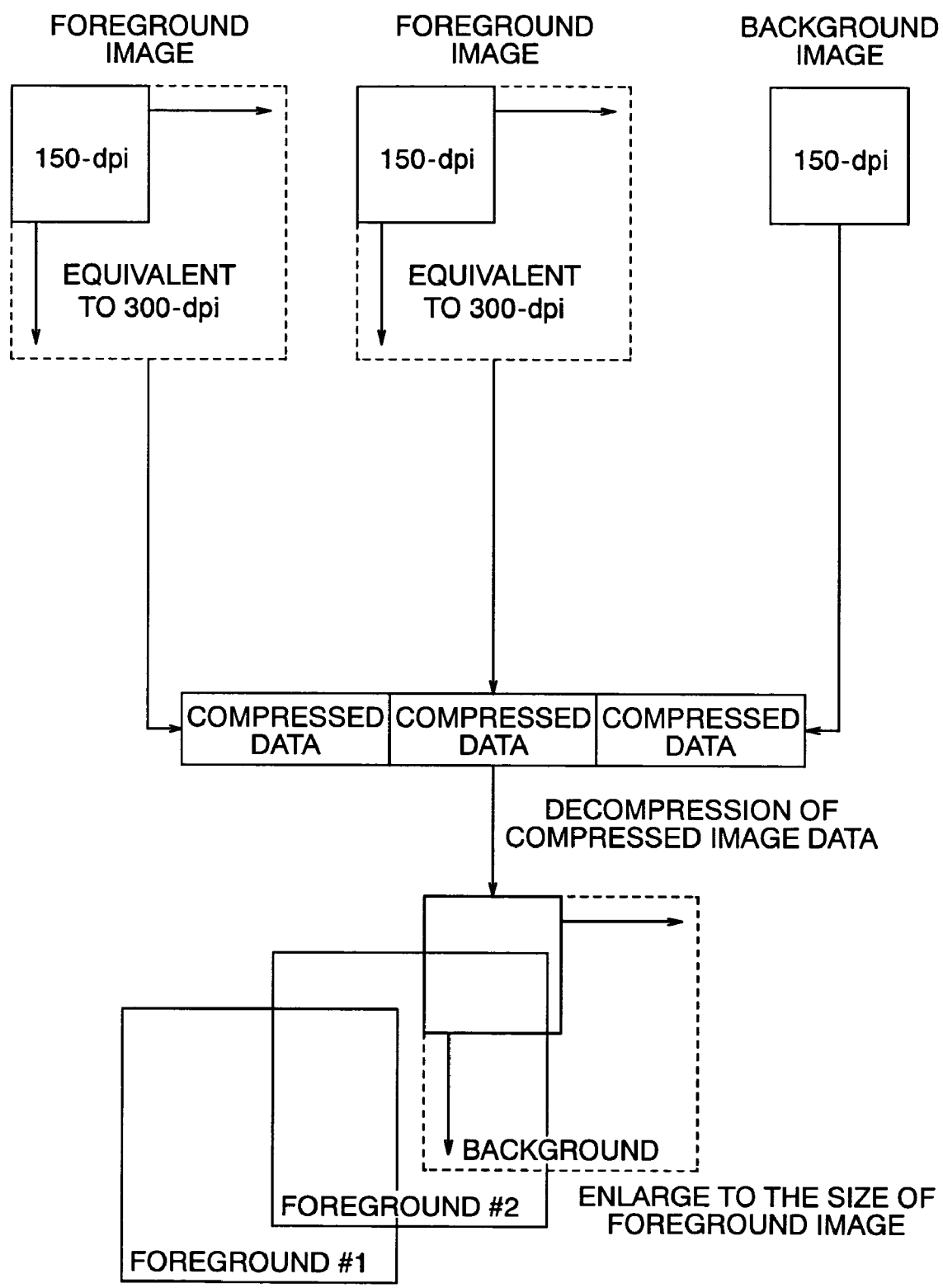
FIG. 14 is a diagram showing process for increasing the resolution of an image read at a low resolution.

If the resolution of the original color document image read by an image input device such as a scanner is low, an adequate picture quality of a drawn object classified as belonging to a foreground image by the foreground/background image classification unit 2 would not be assured unless its resolution is not changed. In such a case, foreground color binary images generated by the color-by-color-based binary image generation unit 3 may be enlarged by approximation such as liner interpolation to increase the resolution of the foreground images as shown in FIG. 14. Then the foreground images may be combined with the low-resolution background image into a compressed file as described above. Thus, the low-resolution image data read through the image input device can be made available as a compressed high-resolution image data. FIG. 14 shows the combination of the enlarged (from 150 dpi to 300 dpi) foreground images of different colors and the background image to reconstruct the original image (150 dpi) as a high-resolution version (300 dpi).

The present invention provides advantages which will be described below.

The size of color document image data read through an image input device such as a scanner or a digital camera can be enormous. The size of the data can be so large that it poses significant problems when the data is stored or transmitted over a network.

Color document image data of such a huge size has been compressed with compression technologies such as JPEG or MMR compression to reduce the amount of data. However, the prior art has the problem that the picture quality of the image generated by using only a single compression technology is degraded because different drawn objects such as characters and photographs in the image have different resolution and color gradation requirements.

To solve the problem, apparatuses have been devised that classify drawn objects in color document image data read as a text area or a photograph area depending on their contents and compress them with different compression technologies appropriate for them.

However, these apparatuses cannot identify text areas when they appear against a dim photograph and therefore mistakenly compresses the text as a photograph area, thereby leading degradation in the picture quality.

In contrast, the image compression apparatus of the invention can select the compression technology from among a number of compression technologies that is most appropriate for a drawn object on the basis of the connectivity between pixels making up the object without classifying a certain area in the image by type such as a text area or a photograph area. Thus, the image containing a photograph and text superimposed on the photograph can be compressed with the most appropriate compression technologies. Accordingly, a high-efficiency compression can be achieved without degrading the picture quality.

What is claimed is:

1. An image compression apparatus for compressing color document image data, the image compression apparatus comprising:
   a connected pixel extraction unit for extracting drawn connected pixels contained in the color document image;
   a foreground/background image classification unit for classifying connected pixel groups extracted by the connected pixel extraction unit as a foreground image or a background image;
   a color-by-color-based binary image generation unit for generating binary image data for each color from information on the color of the connected pixel groups classified as a foreground image;
   a foreground image compression unit for compressing the color binary image data generated by the color-by-color-based binary image generation unit;
   a background image generation unit for generating a background image;
   a background image compression unit for compressing the background image generated by the background image generation unit; and
   a compressed image data generation unit for combining the foreground image data compressed by the foreground image compression unit with the background image data compressed by the background image compression unit into a single piece of compression image data.

2. The image compression apparatus according to claim 1, wherein the background image generation unit reduces the background image to generate a reduced image with a low image resolution.

3. The image compression apparatus according to claim 1, wherein the background image generation unit generates a background image in which each pixel in a foreground image portion included in the background image is filled with a pixel color similar to the color of the neighboring pixel.

4. The image compression apparatus according to claim 1, wherein, in a case that the resolution of a color document image data inputted through an image input device is low, binary image data generated by the color-by-color-based binary image generation unit is converted into a high-resolution image by approximation such as linear interpolation and the image is compressed by the foreground image compression unit.

* * * * *